United States Patent Office.

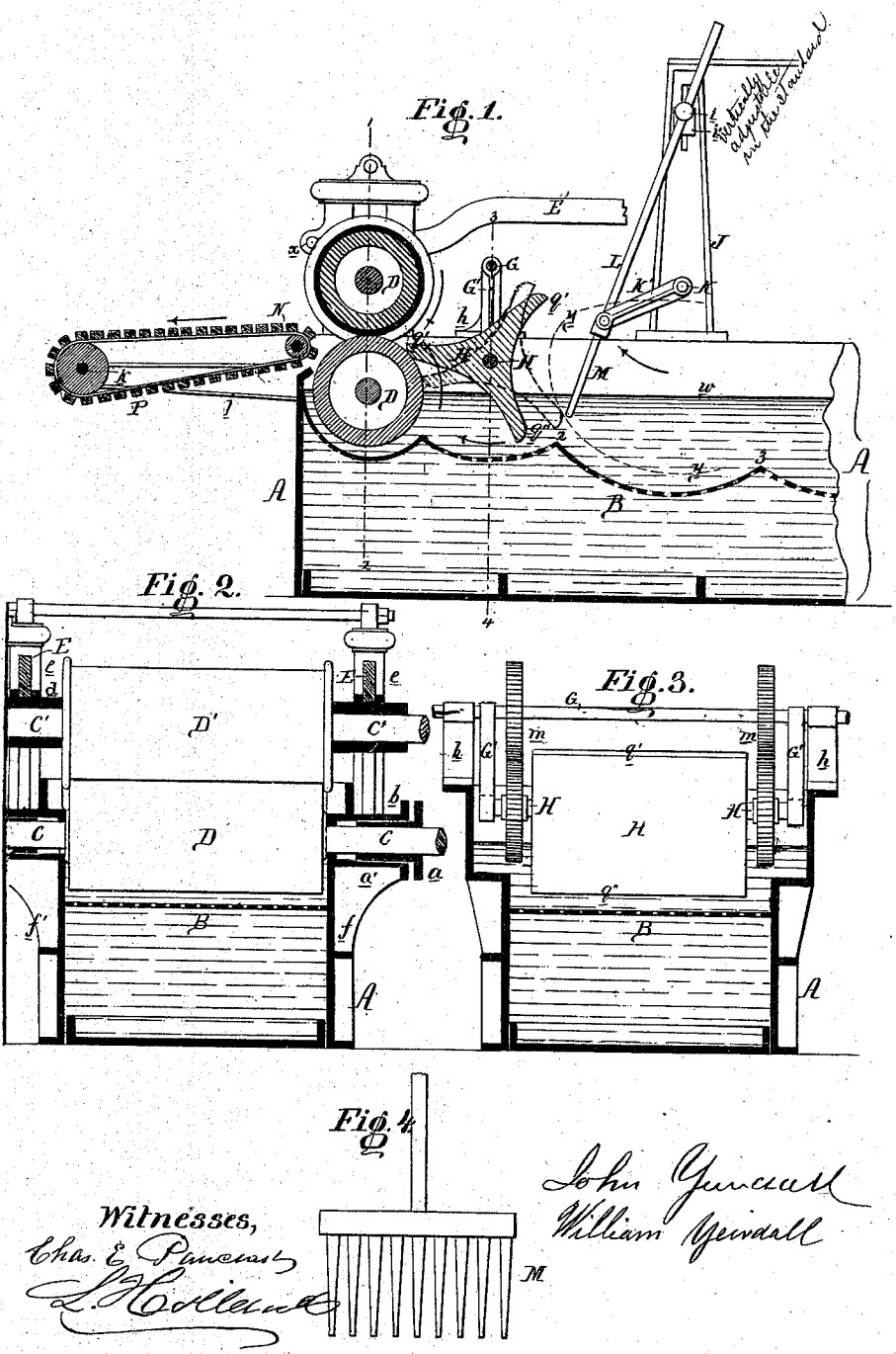

JOHN YEWDALL AND WILLIAM YEWDALL, OF PHILADELPHIA, PENNSYLVANIA.

Letters Patent No. 107,846, dated September 27, 1870.

IMPROVEMENT IN WOOL-WASHING MACHINES.

The Schedule referred to in these Letters Patent and making part of the same.

We, JOHN YEWDALL and WILLIAM YEWDALL, both of Philadelphia, county of Philadelphia, State of Pennsylvania, have invented an Improved Washing-Machine, of which the following is a specification.

Nature and Object of our Invention.

Our invention relates to improvements in that class of wool-washing machines in which the wool is acted on in washing-fluid contained in a tank, by rakes, as described in our patent of November 20, 1866; and Our present improvements consist—

First, of a rake caused to operate on the wool contained in the washing-fluid in a tank, substantially as described hereafter, in combination with a cradle having any desired number of ribs and concavities, and caused to revolve in the said washing-fluid, the movements of the rake and cradle being so timed that the former will move a mass of wool into each concavity of the cradle, to be delivered by the latter to the pressure-rolls, as described hereafter.

Secondly, of the said cradle, so suspended and so arranged, in respect to the pressure-rollers, that, as it revolves, it will carry the wool round, and deliver it to the point where the rollers converge, as explained hereafter.

Thirdly, in causing the lower pressure-roller to revolve in water-tight bearings, so that the washing-fluid may be maintained at an altitude which renders it an available aid to the cradle in delivering the wool to the pressure-rollers.

Fourthly, of a perforated partition, so arranged in the tank containing the washing-fluid that it will conform to the course taken by the rake, cradle, and lower pressure-roller, and confine the wool within proper limits.

Description of the Accompanying Drawing.

Figure 1 is a vertical section of sufficient of a wool-washing machine to illustrate our improvements;

Figure 2, a transverse vertical section on the line 1 2, fig. 1;

Figure 3, a transverse vertical section on the line 3 4, fig. 1; and

Figure 4, a view of the lower end of the rake.

General Description.

A represents a portion of a long trough or tank, across which extends a perforated plate, B, curved in the manner shown in fig. 1, the tank being, in the present instance, made of cast-iron plates, fitted and secured together in the manner illustrated in the drawing.

In the opposite sides, $f$ and $f'$, of the tank are formed water-tight bearings for the shaft $c$ of the roller D, these bearings being best observed in the sectional view, fig. 2, where $a$ represents a follower, adapted to the shaft $c$ and to a socket, the lower portion $a'$ of which is formed in and constitutes a part of one side plate of the trough, the upper portion consisting of a cap, $b$, which is so secured to the side of the trough as to be detachable therefrom.

Suitable packing is confined between the end of the follower and the end of the socket, so as to render the bearing perfectly water-tight.

The shaft $c'$ of the upper roller D' turns in bearings $d$, which are arranged to slide in guides $e\ e$ attached to or forming part of the opposite sides, $f$ and $f'$, of the tank.

Each of the bearings $e$ is depressed by means of a lever, E, which has for its fulcrum a pin, $x$, and which is furnished with such weights as may be necessary to impart the desired pressure to the upper roller D', to accomplish which any other system of weighted levers or other equivalent apparatus may be employed.

To the upper edge of each side, $f$ and $f'$, of the tank is secured a standard, $h$, in which is arranged to revolve a shaft, G, and on this shaft are loosely hung two arms, G' and G', in the lower end of which turns a shaft, H, carrying a cradle, H', which, in the present instance, consists of three radial ribs, $q, q^1$, and $q^2$, forming the same number of concavities between the ribs.

A standard, J, is secured to the upper edge of one side of the tank, A, and in a projecting hub on this standard turns a shaft, K, having a crank, K', the outer end of which is connected to an adjustable pin on the rod L, the upper end of the latter being arranged to slide freely in a stud, $i$, which is secured to, but so as to vibrate on, a plate, $i'$, so attached to the standard J as to be adjustable vertically thereon.

The lower end of the rod L terminates in a rake, M, best observed in fig. 4, the ends of the prongs of this fork taking the course shown by the dotted line $y$, as the shaft K revolves, and the partition B being curved between the points 2 and 3, to suit this course taken by the prongs.

A shaft, N, at the rear of the machine, is arranged to turn in the opposite sides of the tank, or in any attachments thereto, and in bearings on projections $j\ j$, at the rear of the tank, turns a shaft, $k$, both shafts ($k$ and N) having rollers, round which passes the endless slatted apron P.

It should be understood that the trough or tank A is much larger than is shown in the drawing, and that there is a number of forks, M, operated by cranks, so as to drag the wool through the washing-fluid, turn it over therein, and direct it gradually toward that end of the tank which is shown in the drawing, the perforated partition B being curved at intervals, so as to conform to the course of the rakes, but being gradually inclined downward, so that, at the front end of the tank, not shown in the drawing, it reaches, or nearly reaches, the bottom of the same.

It will be observed that this perforated partition is curved beneath the roller D, so as to conform to the shape of the latter, without being in contact with it. The partition is also curved beneath the cradle H', in conformity with the direction pursued by the ends of the ribs, as the cradle revolves.

Different systems of gearing may be employed to operate the moving parts of the machine, but, whatever gearing may be employed, it is essential that the apron P should traverse, and the roller D D', cradle H', and crank K should revolve, in the direction pointed out by their arrows, and also that the crank K should revolve exactly three times as fast as the cradle, or four times as fast as the cradle if the latter has four ribs, $q$, and four concavities instead of three.

It will be observed that the cradle is hung loosely by arms G' G' to the shaft G, and can consequently swing to and fro as it revolves, the wheels $m$ $m$ for driving the cradle not interfering with this swinging movement. As each rib comes in contact with the surface of the roller D, the entire cradle will swing to the right, and assume the position shown by dotted lines in fig. 1; but as each rib passes from the prominent surface of the roller, the tendency of the arms G' G', which carry the cradle, to assume a vertical position, causes the said cradle to swing to the left, and assume the position shown by plain lines in fig. 1.

The line $w$ represents the average level of the fluid in which the fibers of the wool are agitated, turned over, and carried toward the rear of the machine, by a series of rakes. The last rake M of the set carries a portion of the wool in the fluid to the position shown in fig. 1, one of the concavities of the cradle being presented for its reception. The rake having left this mass of wool, the latter is carried round by the arm $q^1$ through the fluid, and delivered to the rollers D and D', which deposit it, in a comparatively dry state, onto the endless apron P.

If the shaft of the cradle revolved in fixed bearings, much of the wool would be carried round by the cradle without being delivered to the rollers; but, as a vibrating motion is imparted to the cradle by its ribs coming in contact with and passing from the surface of the roller, the cradle will move toward the rollers as each rib approaches the point where the two rollers converge, and hence the supply of wool above the rib will be directed to this point, and must pass between the rollers.

It will be seen that, as the machine operates, each concavity of the cradle will receive from the rake a supply of wool, and will carry this supply round, and thrust it, as it were, between the rollers.

This delivery of the wool to the rollers by the cradle, however, could not be effectually accomplished in the absence of the fluid, or, rather, if the fluid was much below the center of the lower roller, for, as the wool is floating or held in suspension in the water, the latter aids the cradle in delivering the wool to the rollers; hence the importance of the water-tight bearings of the shaft $c$, which permit the fluid to be maintained at a proper altitude for aiding the cradle in effecting this delivery.

*Claims.*

1. In a wool-washing machine, the combination of a rake, operating substantially as described, with a revolving cradle, having any appropriate number of ribs and concavities, when the movement of the rake and cradle are so timed that the former will move a mass of wool into each concavity of the latter, as herein set forth.

2. The cradle H', so suspended and arranged in respect to the rollers that, as it revolves, it will receive a swinging or vibrating motion, as described.

3. The roller D, arranged with its bearings below the surface of the water, and operating, in combination with the cradle, substantially as described.

4. The combination of the rake M, revolving and vibrating cradle H', and rollers D and D', the whole operating substantially as described.

5. The perforated partition B, arranged in respect to the fork M, cradle H', and roller D, as set forth.

In testimony whereof, we have signed our names to this specification in the presence of two subscribing witnesses.

JOHN YEWDALL.
WILLIAM YEWDALL.

Witnesses:
CHAS. E. PANCOAST,
L. HOLLAND.